United States Patent Office 3,457,219
Patented July 22, 1969

3,457,219
LIQUID POLYMERCAPTAN RESINS STABILIZED WITH NITROGENOUS BASES
Paul H. Goble and Edwin M. Smolin, Painesville, Tze Seng Wang, Fairport Harbor, and Frank R. Volgstadt, Painesville, Ohio, assignors to Diamond Shamrock Corporation, Cleveland, Ohio, a corporation of Delaware
No Drawing. Filed May 27, 1966, Ser. No. 553,318
Int. Cl. C08g *51/60*
U.S. Cl. 260—45.8      4 Claims

ABSTRACT OF THE DISCLOSURE

Polymercaptan resins having SH functionality greater than 2 and a number average molecular weight between about 800–10,000 achieve enhanced shelf stability by blending before storage with a nitrogenous base stabilizer. Such stabilizers most usually have a $pK_a$ in aqueous solution at 25° C. between about 2–9 and preferably have low volatility. Such useful bases include amines, amides, ureas, and oximes.

---

This invention relates to new resin compositions of enhanced storage stability and to their preparation and more particularly relates to compositions of liquid polymercaptan resins containing stabilizing amounts of inert base.

Polymercaptan resins are often formulated for eventual use in sealing and caulking compositions. When later used, the liquid, often viscous, resins can be mixed with fillers, pigments, and often with plasticizers, and also catalysts for subsequent curing. However, depending upon the length of time involved, and the temperatures encountered during the handling and storage of the polymercaptan resins, such resins prior to use can be affected by a change in physical properties, e.g., a deleterious decrease in viscosity, often occurring in only a month or less at storage temperatures between about 40–140° F. Because of such change, these resins can become impractical to cure to useful elastomers, or only partially cure to a mass which is essentially unchanged from the initial viscous liquid and which is thus an undesirable substance for sealing and caulking compositions.

Now, polymercaptan compositions have been found which exhibit excellent shelf stability, i.e., these compositions can be stored for extended periods of time, e.g., 1–2 years and longer without undergoing deleterious viscosity decrease. Subsequently these polymercaptan compositions can be quickly and simply cured to prepare products which are desirable elastomeric materials.

Broadly, the novel resinous composition comprises a liquid solution of polymercaptan resin having an SH functionality greater than two and a number average molecular weight between about 800–10,000, and a stabilizing amount of nitrogenous base, which base is soluble in the polymercaptan resin, wherein cured product from a mixture of the resinous composition pretreated with 30 percent strength aqueous hydrogen peroxide retains at least about 70 percent of the hardness exhibited by cured product from peroxide-free resinous composition.

One aspect of this invention is the stabilization of polymercaptan resins by nitrogenous bases having low volatility and elevated $pK_a$.

Another aspect of this invention is the stabilization of polymercaptan resins prepared from halogenated polyhydric polyethers obtained from polyoxyalkylene modified polyhydric alcohols reacted with a halogen-containing epoxide.

Another aspect of this invention is the process of stabilizing the liquid polymercaptan resins, which are more particularly discussed hereinbelow, by mixing such resins with a stabilizing amount of nitrogenous base to prepare a resulting mixture capable of preparing the hereinabove disclosed cured products, i.e., one prepared from the hydrogen peroxide mixture, which product retains at least about 70 percent of the hardness exhibited by the cured product prepared from peroxide-free resinous composition.

The polymercaptan resin component of the composition must have an SH functionality greater than two, that is, it must have an average of greater than two —SH groups per resin molecule. Additionally, the resin must be virtually free from molecules bearing only one —SH group, so that the molecules of the polymercaptan resin component must contain two or more, e.g., up to 10, —SH groups per moelcule. Compositions containing resin molecules which have only one —SH group per molecule, or which have virtually all resin molecules containing just two —SH groups, are generally fluid after curing and can be subject to cold flow after application. Advantageously, for preparing cured products of enhanced resistance to cold flow which also have desirable tensile strength for use in sealing and caulking compositions, a resin is used which has an SH functionality between about 2.1–9. Additionally, the polymercaptan resin component should have number average molecular weight between about 800–10,000. Resins having an SH functionality greater than two, but which have molecular weight below about 800, form products of retarded elasticity, which are undesirable sealants, while resins having molecular weight above about 10,000 can be highly viscous, refractory materials which are uneconomical and impractical to cure.

Exemplary resins for the polymercaptan component, which resins during storage often can exhibit a deleterious viscosity decrease in a period of only six months or less when prepared without a stabilizing amount of nitrogenous base, are those resins prepared from polyepoxides having an epoxy equivalency greater than two, i.e., the number of epoxy groups contained in the average polyepoxide molecule is greater than two. Such polyepoxides can be employed in preparing the polymercaptan resin by reaction with hydrogen sulfide, for example, or reaction with a metallic sulfhydrate, such as sodium sulfhydrate or potassium sulfhydrate, alone or together with hydrogen sulfiide.

Examples of the polyepoxides which can be used in forming the polymercaptan resin include the polyepoxy-containing polymeric reaction product of a halogen-containing epoxide with an aliphatic polyhydric alcohol, e.g., glycerol, pentaerythritol, 1,2,6-hexanetriol, or 1,3,5-pentanetriol wherein a portion of the halogen containing epoxide can be formed from an aromatic polyhydric phenol such as resorcinol, catechol, or bis-phenol, and a halogen-containing epoxide such as an epihalohydrin or 3 - chloro - 1,2 - epoxybutane. Further exemplary polyepoxides are those obtained by reacting a polyhydric phenol with a polyepoxide compound such as bis(2,3-epoxypropyl) ether, or bis(2,3-epoxy-2-methylpropyl) ether, or those obtained as the reaction product of such a polyepoxide compound with an aliphatic polyhydric alcohol.

Another serviceable group of polyepoxides include esters of epoxy acids and polyhydric alcohols, or phenols, containing three or more hydroxyl groups, for example, esters of 2,3-epoxypropionic acid reacted with glycerol (or with 1,2,6-hexanetriol) and esters of 3,4-epoxybutanoic acid and polyvinyl alcohol. Other suitable polyepoxides are those esters of epoxy alcohols and polycarboxylic acids containing three or more carboxylic groups, i.e., triglycidyl ester of 1,2,4-butanetricarboxylic acid, triglycidyl esters of 1,3,6-hexanetricarboxylic acid, and glycidyl ester of pyromellitic acid.

Polymercaptan resins which generally are present in mixture with polymercaptans formed from the above described polyepoxide precursors and which, for economy and efficiency, advantageously form only about 20 weight percent or less of the total polymercaptan resin component include resins prepared from the reaction of hydrogen sulfide with polythiuranes. Other such polymercaptan resins which generally are mixed with the polymercaptans derived from the above described polyepoxide precursors, include the epoxidized polymers and copolymers of compounds such as isoprene and butadiene which have been reacted with hydrogen sulfide, as well as mercaptoethyl esters of polyacrylic acid and mercaptobutyl esters of copolymers prepared from methacrylic acid and styrene.

The especially preferred polymercaptan resins, for economy, are those prepared by initially reacting a polyhydric alcohol, such as 1,2,6-hexanetriol, glycerol, or pentaerythritol, with an alkylene oxide, for example propylene oxide or ethylene oxide, there usually being a substantial molar excess of alkylene oxide present during reaction, and thereafter reacting the resulting polyoxyalkylene-modified polyhydric alcohol with a halogen containing epoxide, e.g., an epihalohydrin or 3-chloro-1,2-epoxybutane, to prepare a halogenated polyhydric polyether, and finally preparing the corresponding mercaptan polymer of such halogenated polyhydric polyether. Such especially preferred resins include those which have been shown in Belgian Patent No. 636,248. These especially preferred resins usually have a number average molecular weight within the range from about 1,000 to about 7,000 and SH functionality between about 2.1 and about 6.

An essential component along with the polymercaptan resin is a nitrogenous base which is soluble in the resin. That is, when used in a stabilizing amount, a substantial portion of the base used will dissolve in the resin at a temperature of about 20° C. and at a pressure of about 760 mm. Hg absolute. Accordingly, the nitrogenous bases are also referred to herein as "nitrogenous base solutes" or "nitrogenous solutes." Essentially all of the nitrogenous bases listed hereinbelow, when used in stabilizing amounts and when mixed with the polymercaptan resin at room temperature, i.e., about 20° C., will undergo virtually complete solution in the resin even under the influence of only gentle agitation.

The nitrogenous solutes must be inert to the resin at temperatures encountered during storage and handling of the resin, e.g., within a temperature range from about −40° to about 150° F., i.e., these solutes must not be capable of chemically combining with reactive groups of the resin, such as aldehyde or epoxide groups at such temperatures. Otherwise, such chemical reaction can impair the stability of the composition, or provide a composition which will be subject to cold flow after curing. However, some of the nitrogenous bases can decompose during mixing which decomposition does not involve reaction with the resin, e.g., urea can decompose to yield ammonia, without sacrifice of stabilizing affect, although generally such decomposition does not occur.

Advantageously, to effectively retain the base within the resin, such bases which are liquid at about 20° C. have boiling points at 760 mm. Hg pressure of above about 100° C. However, bases which have lower boiling points at atmospheric pressure can be serviceable where care is exercised to prevent substantial vapor loss of the stabilizer prior to resin cure. Particularly when used with the preferred polymercaptan resins prepared from halogenated polyhydric polyethers, strong bases, especially the hydroxides of the alkali and alkaline earth metals, can cause gellation of the resin upon mixing therewith. However, weak bases can often provide only slight enhancement, if any, in resin stability. Advantageously for good resin stability and for freedom from resin gellation prior to cure, the nitrogenous base has an ionization constant, expressed as the $pK_a$ of the base in aqueous solution at 25° C., between about 2–9, and preferably, for excellent stability and for enhanced freedom from gellation, has a $pK_a$ in aqueous solution at 25° C. between about 3–8.

The nitrogenous stabilizers can be amines, amides, ureas, oximes, and the like, which can be aliphatic, aromatic, or heterocyclic, and additionally the amines can be primary, secondary, or tertiary and the ureas can be substituted or unsubstituted. Suitable nitrogenous stabilizers include N,N-dimethylcaproamide, triethanolamine, N-methylmorpholine, methyl diethanolamine, N,N',N'',-N'''-tetrakis (2-hydroxypropyl) ethylenediamine, 4-isopropylpyridine, urea, p-phenylenediamine, quinoline, α-picoline, benzoguanamine, di-triisopropanol amine, N-hydroxyethylmorpholine, tris(dimethylaminomethyl) phenol, 2-amino-2-methylpropanol, butyraldehyde oxime, ethanol urea, N-butylurea, furfuryl amine, dimethyl formamide, N,N-dimethylaniline, N-ethylmorpholine, and Mervan A, an organic nitrogenous base which is a mixture of organo-metallic substituents and is a straw colored liquid having a specific gravity of 1.028 and an ash of about 10–12 percent. Preferably an ethylenediamine-propylene oxide reaction product, such as N,N',N'',N'''-tetrakis (2-hydroxypropyl) ethylenediamine, is used for economy and low solute volatility, e.g., low volatility within a storage temperature range from about −40° to about 150° F.

The nitrogenous bases which are servicable in preparing liquid polymercaptan resin solutions having enhanced stability, are also those bases which contribute to the enhanced performance of cured products prepared from resinous solutions which have been subjected to the hereinbelow described hydrogen peroxide procedure. It has been found that the changes in the characteristics of the polymercaptan resin, such as changes in resin viscosity, pH, SH functionality, and hardness after curing, which accompany resin aging, can be essentially duplicated by a hydrogen peroxide test. Thus, nitrogenous bases can be conveniently observed and selected without lengthy storage testing, e.g., the deleterious aging changes taking place in the resin from about four weeks' storage, generally at an elevated temperature of about 120–170° F., can be essentially duplicated in a few hours from the peroxide test.

Typically, in this accelerated test, a 30 percent aqueous solution of hydrogen peroxide is used for economy, and the weight proportion of resinous solution to hydrogen peroxide is between about 50:0.1 to about 33:0.1. A weight proportion of resinous solution to hydrogen peroxide of greater than about 50:0.1 will generally not provide sufficient hydrogen peroxide to essentially duplicate the deleterious storage changes, while a weight proportion of resinous solution to hydrogen peroxide of less than about 33:0.1 can yield subsequent resinous masses which will not provide useful data, e.g., such masses can be too fluid after curing to provide comparative hardness data. Preferably, to obtain the most significant data, i.e., data resulting from normal storage, the weight proportion of resinous solution to hydrogen peroxide is between about 42:0.1 to 38:0.1.

This peroxide-containing mixture is then maintained at a temperature of about 65–75° C. for at least about 4 hours, and advantageously, to insure reaction efficiency, for about 6–18 hours, and the resulting material is subsequently cured. The bases which are serviceable for enhancing the stability of polymercaptan resins are those which yield cured elastomers, from the peroxide-tested mixtures, which retain at least about 70 percent of the hardness achieved by cured products from identical resinous solutions (often freshly prepared only a few days, or less, before curing), except that such identical solutions have not been subjected, prior to cure, to the peroxide test. For convenience, the comparative resin solutions which are cured without being subjected to the accelerating peroxide test, are usually referred to herein as being "peroxide-free" solutions, while those solutions which have been subjected to the peroxide test are generally referred to herein as "peroxide-containing" solutions.

Those nitrogenous bases which yield cured products from peroxide-containing mixtures that achieve less than about this 70 percent comparative hardness, can be ineffective in enhancing the stability of the polymercaptan resin, e.g., such bases as diphenyl amine, pyridine, and o-toluidine, or can actually impair resin stability, that is, hasten resin instability during storage, such as ethylene thiourea and polyvinylpyrrolidone. Preferably for enhanced stability, the nitrogenous base is one which will prepare cured products from peroxide-containing mixtures, which products achieve at least about an 80 percent comparative hardness.

In curing both the peroxide-containing resinous mixture or the comparative peroxide-free, resinous mixture, the conventional curing agents are typically used, e.g., cumene hydroperoxide, benzoyl peroxide, t-butyl hydroperoxide, methyl ethyl ketone peroxide, divinyl sulfone, lead dioxide, manganese dioxide, zinc dioxide, and tellurium dioxide. Preferably, for short curing times, ammonium dichromate is used as the curing agent. Although use of the same curing agent is preferred in comparative tests to achieve the most significant data, those agents which produce essentially identical hardness data for products from the same resinous mixture, can generally be employed interchangeably.

With any of the curing agents employed following the accelerated peroxide test, elevated temperatures, i.e., above about 50° C., are used to achieve an efficient cure. For the preferred ammonium dichromate curing agent, a temperature within the range from about 65° to about 75° C. is typically employed for fast and economical curing. For such temperature, at least about 10 minutes is necessary to achieve uniform curing. Preferably, for obtaining the best comparative hardness data, the identical curing procedure is employed for preparing comparative products, although some variation can usually be tolerated. For example, with the use of the preferred ammonium dichromate, comparative materials can generally be cured at any temperature within the range of about 65–75° C., inclusive. Additionally, longer curing times, e.g., about 20–30 minutes, will usually not interfere with the acquisition of significant data for comparison with data obtained from products subjected to shorter curing times, such as 10–12 minutes.

Typically, the nitrogenous base is simply mixed with the resin in conventional manner at room temperature, e.g., the base is blended with the resin under the influence of gentle to vigorous agitation at a temperature of about 20° C. For the preferred polymercaptan resins, and for polymercaptan resin mixtures containing about 70 weight percent or more of these resins, about 0.01–5 weight percent of base, basis weight of polymercaptan resin, will provide a stabilizing amount of nitrogenous base. Less than about 0.01 weight percent of base will usually not provide a desirable increase in resin stability, while greater than about 5 weight percent of base can subsequently yield cured elastomers which are subject to cold flow. Preferably for enhanced resin stability and subsequent resistance to cold flow in cured products, the liquid polymercaptan contains about 0.05–1 weight percent of nitrogenous base.

For the preferred polymercaptan resins, and those polymercaptan resin mixtures which contain at least about 70 weight percent of these resins, use of a stabilizing amount of nitrogenous base should yield a resinous mixture having a pH between about 5.2–9. Resulting compositions having a pH below about 5.2 can exhibit instability in an undesirably short storage time of only a few months or less. Resulting compositions which have a pH above about 9 can oxidize, e.g., under the influence of atmospheric oxygen, to form an undesirable "skin," or gellatinous covering of oxidized resinous composition, at exposed surfaces of the liquid resin; this skin is generally not serviceable for subsequent elastomeric use and must be discarded. For prolonged stabilization with retardation of skin formation, the final resin pH is preferably between about 5.5–8.5.

In addition to the resin and nitrogenous base, the compositions can include, typically, pigments, fillers, brighteners, plasticizers, diluents, dyes, retarders, accelerators, and other resinous substances in addition to the polymercaptan resins, as well as other additives or components which can be formulated into sealing or caulking compositions.

The following examples show ways in which the invention has been practiced but should not be construed as limiting the invention. Unless otherwise specified, the parts disclosed in the examples are parts by weight and the temperatures are in degrees centigrade.

Example 1

The polymercaptan resin employed in this example is a water-white liquid having a pH of 5.8, a molecular weight of about 6,000, and an SH functionality of 2.3 as measured by iodimetric titration. The resin is prepared from a propylene oxide derivative of trimethylol propane, which derivative is then reacted with epichlorohydrin, and then subsequently with sodium sulfhydrate to prepare the polymercaptan resin. To 100 parts of this resin there is added, with agitation, 0.2 part of a nitrogenous base which is N,N',N'',N'''-tetrakis(2 hydroxypropyl)ethylenediamine, thereby preparing a liquid solution which is ostensibly free from dispersed droplets of undissolved nitrogenous base. This resulting resinous solution has a pH of 7.9 and a viscosity of about 5,000 centipoises at 25° as measured with a number 6 spindle at 100 r.p.m. on a Brookfield viscosimeter.

This resulting resinous solution, after one week's exposure to air at a temperature of 150° F. (to achieve accelerated testing) exhibits a pH of 8.3 and a viscosity of 5820 centipoises measured as described above. Comparatively, a 100 part sample of this polymercaptan resin which is not blended with nitrogenous base, but which is stored and examined as disclosed above, displays a poor pH of 4.9 and a viscosity of only 4030 centipoises.

Example 2

To 100 parts of the polymercaptan resin of Example 1, having a pH of 5.2, there is added 0.5 part of quinoline, which has a $pK_a$ in aqueous solution at 25° of 4.94 and a boiling point of 237.7° at 760 mm. Hg pressure. The resulting liquid solution is ostensibly free from undissolved droplets of quinoline, and has a pH of 5.7.

The resulting solution is divided into two aliquot portions, A and B, and to the A portion there is added 0.01 part (about 0.02 weight percent, basis weight of portion A) of a 30 percent strength aqueous hydrogen peroxide solution. The resulting peroxide-containing mixture is heated at a temperature of 70° for 18 hours. For curing there is then added 13.4 parts catalyst and thereafter 6.6 parts water to both the resulting A portion and the peroxide-free B portion. The catalyst is a mixture of 100 parts ammonium dichromate, 57 parts dioctylphthalate, and 10 parts stearic acid. Each portion is then heated in an oven at 70° for 10 minutes and then cooled in a constant temperature (25°) bath for one minute. Each resulting molded product has a rubber-like consistency.

Each product is then subjected to a durometer hardness test by the Type A instrument manufactured by Shore Instrument and Mfg. Co., Inc., which instrument has been shown in ASTM D676–58T, 1958 edition, part 9, page 1305. For convenience, the hardness data received from such an instrument is referred to herein as the "Shore A" hardness. The product prepared from the peroxide-free B composition displays a Shore A hardness of 15, and the product prepared from the peroxide-containing mixture displays a Shore A hardness of 12, i.e., it retains 86% of the hardness exhibited by the product from the peroxide-free composition. When the polymercaptan resin is not mixed with the quinoline, but is pretreated with hydrogen peroxide and cured in the above-described manner without the benefit of prior blending with any nitrogenous base, the Shore A hardness of the resulting cured product is only about 0.5.

Example 3

To 100 parts of the polymercaptan resin of Example 1 there is added 0.5 part of dimethyl formamide, thereby preparing a resinous liquid solution. In comparative testing of the cured products prepared from two separate portions of this solution in accordance with the peroxide procedure of Example 2, and curing of each portion being performed in the manner of Example 2, the cured product from the peroxide-treated portion displays an excellent 100 percent hardness retention when compared with the hardness of cured product from the peroxide-free resinous composition.

Example 4

To 100 parts of the polymercaptan resin of Example 1 there is blended 0.5 part of n-butylurea, thereby forming a resinous liquid solution. In comparative testing of the cured products obtained from two separate portions of this solution in accordance with the peroxide procedure of Example 2, both portions being cured in the manner of Example 2, the cured product from the peroxide-treated portion displays a 100 percent hardness retention when compared with the hardness of cured product from the peroxide-free resinous composition.

Example 5

To 100 parts of the polymercaptan resin of Example 1 there is added 0.5 part of butyraldehyde oxime, thus preparing a resinous liquid solution having a pH of 5.7. In comparative testing of the cured products obtained from two separate portions of this solution, one portion being modified in accordance with the peroxide procedure of Example 2, and both portions being cured in the manner of Example 2, the cured product from the peroxide treated portion displays an 86% hardness retention in comparison with the hardness of cured product from the peroxide-free resinous composition.

Example 6

To 100 parts of a liquid polymercaptan resin solution which is the same as the resin solution of Example 1 there is blended 100 parts of calcium carbonate filler having an average particle size of 0.05 micron. The resulting mixture is cured in the manner described in Example 2, thereby forming an elastomer having a tensile strength of 360 p.s.i., a Shore A hardness of 40, an elongation (percent) of 490, and a tear strength (p.s.i.) of 80. This elastomer is considered to be highly desirable for use as a caulking compound.

Example 7

This example illustrates the use of a nitrogenous base which is not a compound of this invention, but rather actually impairs the stability of the polymercaptan resins.

To 100 parts of the polymercaptan resin of Example 1 there is added 0.5 part of diphenyl amine, thus preparing a resinous liquid solution having a pH of 5.2. A portion of this solution is treated with hydrogen peroxide in the manner of Example 2, and then is further cured also in the manner of Example 2. The resulting cured product displays a poor Shore A hardness of 2.

An additional portion of the resinous composition has, when freshly prepared, a viscosity of about 5130 centipoises at 25° as measured with a number 6 spindle at 100 r.p.m. on a Brookfield viscosimeter. However, when the viscosity of this additional portion is measured in the same manner after only four weeks' storage at 150° F. while exposed to the air, the viscosity has sharply decreased to 4350 centipoises.

Since many different embodiments of the invention may be made without departing from spirit and scope thereof, it is to be understood that the invention is not limited by the specific illustrations except to the extent defined in the following claims.

What is claimed is:

1. A resinous composition comprising a liquid solution of (A) polymercaptan resin having an SH functionality between 2–10 and a number average molecular weight between about 800–10,000 and (B) a stabilizing amount of a nitrogenous base having a $pK_a$ in aqueous solution at 25° C. above about 2.

2. The composition of claim 1 wherein said nitrogenous base has a $pK_a$ in aqueous solution at 25° C. between about 2–9 and a boiling point above about 100° C. at a pressure of 760 mm. Hg absolute, and said polymercaptan resin is stabilized with between about 0.01–5 weight percent of said nitrogenous base.

3. The composition of claim 1 wherein said polymercaptan resin has an SH functionality between about 2.1–6, and a molecular weight between about 1,000–7,000, which resin is prepared from a halogenated polyhydric polyether obtained from a polyoxyalkylene-modified polyhydric alcohol reacted with a halogen-containing epoxide, and the resulting stabilized mixture has a pH between about 5.2–9.

4. A resinous composition comprising a liquid solution of (A) polymercaptan resin having an SH functionality between 2–10 and a number average molecular weight between about 800–10,000 and (B) a stabilizing amount of a nitrogenous base selected from the group consisting of N,N-dimethyl-caproamide, triethanolamine, N-methyl-morpholine, methyl diethanolamine, N,N',N'',N'''-tetrakis (2-hydroxypropyl) ethylenediamine, 4-isopropylpyridine, urea, p-phenylenediamine, quinoline, a-picoline, benzoguanamine, di-triisopropanol amine, N-hydroxyethylmorpholine, tris(dimethylaminomethyl) phenol, 2-amino-2-methyl-propanol, butyraldehyde oxime, ethanol urea, N-butylurea, furfuryl amine, dimethyl formamide, N,N-dimethylaniline, and N-ethylmorpholine.

References Cited

UNITED STATES PATENTS

| | | | |
|---|---|---|---|
| 2,729,614 | 1/1956 | De Pree et al. | 260—45.9 |
| 3,000,865 | 9/1961 | Gurgiolo | 260—79 |
| 3,258,495 | 6/1966 | Le Fave et al. | 260—609 |
| 3,278,496 | 10/1966 | Le Fave et al. | 260—79 |
| 2,992,210 | 7/1961 | Gluckman | 260—79.7 |
| 3,305,536 | 2/1967 | Warner | 260—79.7 |

DONALD E. CZAJA, Primary Examiner

R. A. WHITE, Assistant Examiner

U.S. Cl. X.R.

117—161; 260—18, 31.8, 37, 45.9, 79